July 2, 1946.   T. G. CUNNING   2,402,986
COATING APPARATUS
Filed Dec. 11, 1942   3 Sheets-Sheet 1

INVENTOR
Thomas George Cunning
BY
ATTORNEY

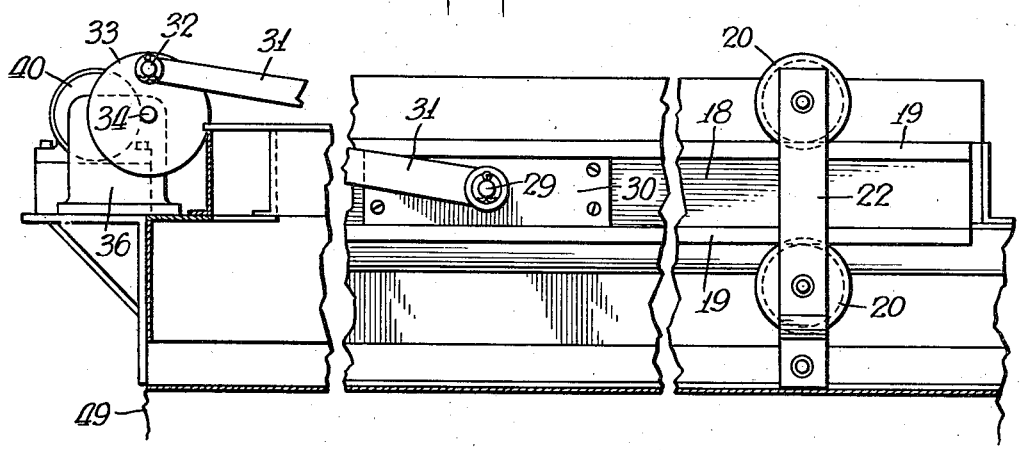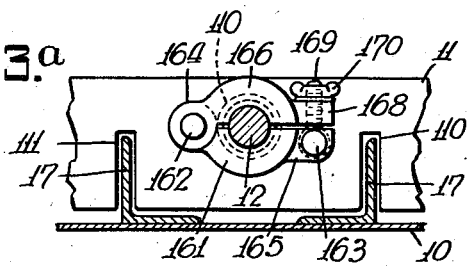

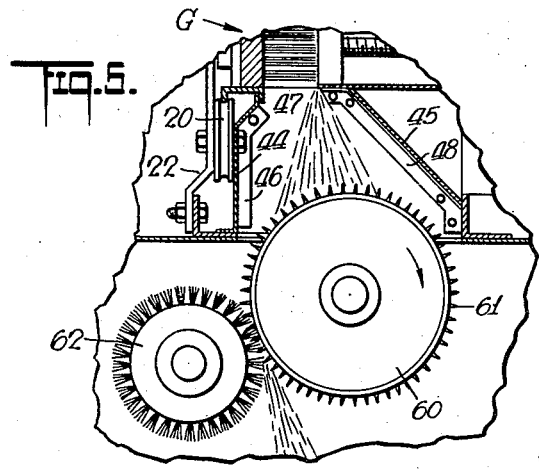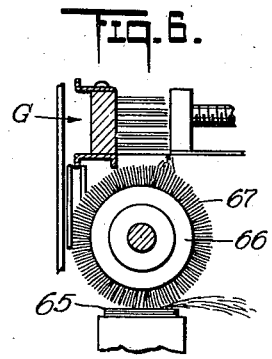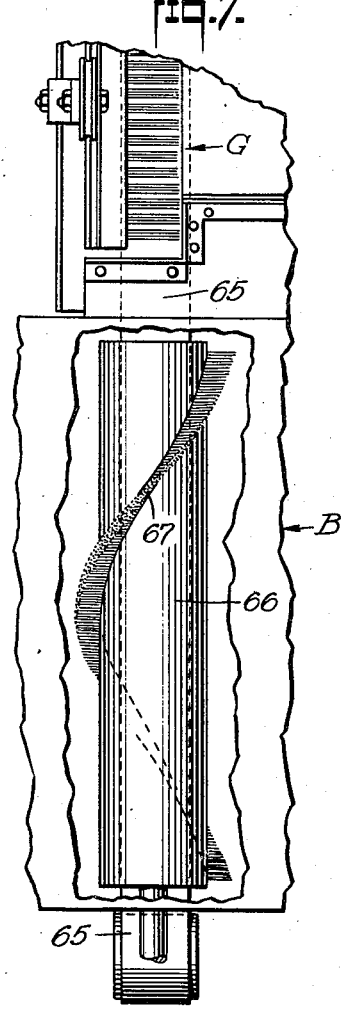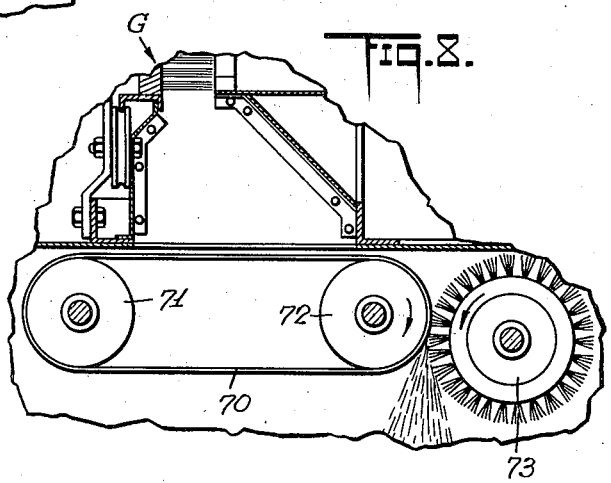

Patented July 2, 1946

2,402,986

UNITED STATES PATENT OFFICE 2,402,986

COATING APPARATUS

Thomas George Cunning, Upland, Calif., assignor to Brogdex Company, Pomona, Calif., a corporation of California Application December 11, 1942, Serial No. 468,636

13 Claims. (Cl. 91—43)

This invention relates to coating apparatus, and it relates more particularly to apparatus useful for wax-coating articles, and especially for wax-coating certain fresh fruits and vegetables in preparing the same for market.

It is now the general practice to apply a protective coating of waxy material to various edible commodities, such as fresh fruit or vegetables, particularly citrus and other fruits. Several methods are employed for that purpose. One method for coating fruit which, for reasons of economy, has been employed to a substantial extent by citrus fruit packers especially, consists in applying to the fruit solid waxy material that is powdered, or at least in rather finely comminuted condition, and then rubbing or brushing the fruit to spread the waxy material in a relatively thin uniform layer over the outer surface thereof. This method is sometimes referred to in the industry as the "powdered wax" method. The present invention has to do more particularly with apparatus useful in finely comminuting waxy material, and also in applying the same in the practice of said "powdered wax" method.

Certain difficulties have been encountered in employing the powdered wax method or process. One of these difficulties is that of producing from a mass or body of solid waxy material a sufficiently fine and flowable comminuted material suitable to use in the waxing procedure. The waxy material to be employed is commercially available usually in the form of slabs, blocks or lumps. If comminuted long in advance of use, much of the waxy material is apt to cohere or clump together into sizable lumps, so that a large part of it is not in a sufficiently fine state of subdivision to be useful for the purpose in view. It has therefore been more usually customary to comminute the waxy material only a very short time, commonly only an instant, before applying it to the fruit. In apparatus heretofore frequently employed to mechanically disintegrate slab wax in carrying out the "powdered wax" process, comminution of the waxy material is customarily accomplished by means of a rotary brush having wire bristles against which the slab is fed. In order to supply the powdered material at a sufficient rate, it has been necessary, because of practical limitations characterizing the apparatus, to run the disintegrator brush at such high speed that considerable heat is generated by the friction between the wire brush and the waxy material, with consequent softening of that portion of the wax slab adjacent the face presented to the brush. This sometimes renders it difficult to comminute the wax to the desired degree and uniformity of fineness, so that more or less of the product discharged from the disintegrating apparatus is often coarser than is desirable for best results in the ensuing coating operation. The presence of relatively coarse particles or pieces is disadvantageous. For one thing, it results in waste of material. Some such coarse particles are, in large part, thrown off by the rapidly rotating polisher brushes (generally horsehair brush rolls), instead of being spread over the articles (e. g. oranges) to be coated, as are the fine particles, by the wiping action of the brushes. Moreover, such of the coarse particles as are not wasted are likely to be acted upon by the polisher brushes in such manner as to render the applied waxy coating non-uniform and give it a streaky or blotched appearance that is unattractive and therefore apt to affect adversely the marketability of the coated article.

A further disadvantage of the rotary brush type of disintegrator for comminuting waxy material is the fact that, as a result of continued use, the wire bristles of the brush tend to take a permanent set or lay in one direction oblique to their original radial position, thus impairing the disintegrating action of the brush on the wax slab fed thereagainst and thereby tending to aggravate the heating-up effect due to friction.

Up to the present time, no simple and relatively inexpensive mechanical means has been known for satisfactorily comminuting solid waxy material to the desired uniformly fine condition suitable for the purposes herein set forth. It is the general object of the present invention to provide an apparatus for producing comminuted waxy material of relatively uniform fineness, and for wax-coating articles with such material, whereby the disadvantages of the previously available apparatus hereinbefore mentioned will be avoided.

With this general object in view and some others which will be apparent to those skilled in the art from the description hereinafter, the invention consists in a disintegrator unit which includes a suitable abrading or disintegrating member mounted for oscillatory movement across and in abrading contact with a face of a slab or block of solid coating material supported in operative relation thereto; and also in the combination of such a disintegrator unit with rubbing or polisher means arranged to receive comminuted coating material discharged from said device and spread the material over articles to be coated. In what is at present regarded as the best practical embodiment of the invention, the oscillatory abrading member is a rectilinearly reciprocable brush with stiff bristles of wire or the like; while the rubbing or polisher unit comprises cooperating rotary brush rolls providing a runway along which pass the articles to be coated, such unit desirably being of a type well known, in and of itself, in the citrus fruit-packing art.

The abrading member of the disintegrator unit of the invention presents to the slab or block of solid coating material an abrading surface that is relatively large and, most desirably, substantially flat; said member being also constructed and arranged to provide sufficient clearance space for ready escape of the comminuted coating material from the abrading zone. Thereby, for a given output of comminuted coating material, it becomes feasible to move the abrading surface more slowly relative to the slab of coating material than was possible with the rotary brush type of disintegrator heretofore employed. This enables virtually eliminating the objectionable tendency of such prior art apparatus to raise the temperature of the normally brittle or crumbly waxy material, in the comminuting operation, to such an extent as to render it soft and plastic enough to interfere with the proper performance of that operation. Importantly contributing to this desirable result is the to-and-fro movement of the oscillatory abrading member whereby it is rendered self-clearing. This self-clearing characteristic is especially pronounced where the abrading or disintegrating member is of the brush type. The flexing of the stiff brush bristles alternately in opposite directions, as well as the variable speed of the brush member in its oscillatory movement, aids greatly in preventing comminuted material from adhering to the bristles and clogging the clearance spaces between the bristle tufts. Such alternately reversed flexing also prevents the bristles from acquiring the before-mentioned objectionable permanent oblique set or lay characterizing a rotary abrading brush.

In some cases, in order to ensure that the comminuted material shall be in the most favorable condition for application to the articles to be coated, at the moment it is delivered to the polisher unit, it is desirable to interpose, between the disintegrator unit or mechanism generally described hereinabove and the polisher unit, means effective to delay somewhat the discharge or delivery of comminuted material from the former to the latter. The employment of such means may be advisable, for example, where the coating material used is much softer and lower-melting than, say, a hard wax such as carnauba. Paraffin wax is an example of such a softer and lower-melting material. When the temperature of such a softer coating material is raised even to the comparatively slight extent necessarily incidental to undergoing comminution with the novel disintegrator apparatus herein disclosed, the physical characteristics of the resultant comminuted material may thereby be so altered as to render it desirable to lower its temperature appreciably before delivering it into the polisher unit and upon the articles therein. This can usually be effected to the desired extent by exposing the finely divided material to the atmosphere in a fairly thin layer for a relatively brief period of time, on the order of 10 to 20 seconds for example, especially if the material is subjected to agitation during at least a part of such delay period. The provision of means for suitably effecting such delay in delivery from the disintegrator to the polisher unit constitutes an important feature of the invention in its more specific aspects.

The invention will first be described in connection with the accompanying drawings which illustrate certain practical embodiments thereof, and will then be more particularly pointed out.

In the drawings,

Fig. 3 is a longitudinal vertical sectional view, partly in elevation, on the line 3—3 of Fig. 2, looking in the direction of the arrows;

Fig. 3—a is a detail view in elevation, partly in section on the line X—X of Fig. 3, looking in the direction of the arrows;

Fig. 4 is a front elevation partly broken away, illustrating the manner of mounting and driving the oscillatory brush.

Fig. 5 is a detail elevation, partly in section, illustrating a construction which includes means for effecting indirect or delayed discharge of comminuted material to the polisher unit;

Fig. 6 is a detail elevation, partly in section, showing another form of such delayed discharge device;

Fig. 7 is a detail plan view of the construction shown in Fig. 6; and

Fig. 8 is a detail elevation partly in section, of another type of delayed discharge device.

Figure 1:
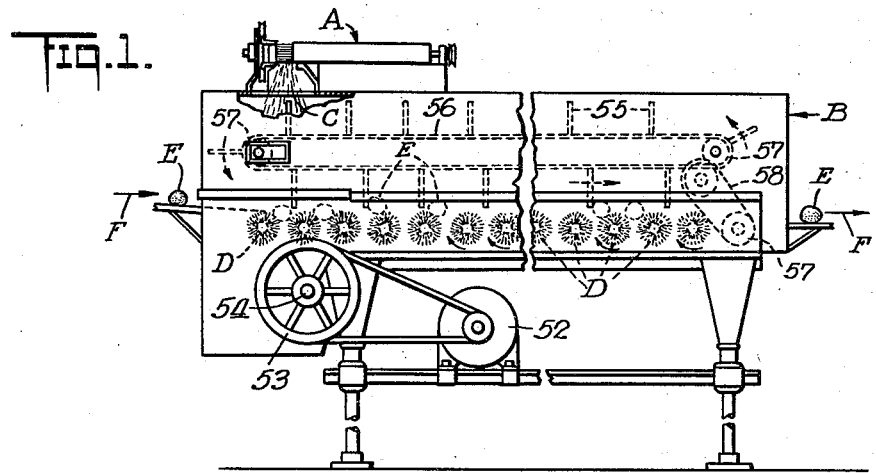
Fig. 1 is a view, in side elevation, of a complete disintegrator-polisher apparatus within the invention, wherein the disintegrator unit is mounted above and discharges directly into the polisher unit.

Referring to Fig. 1, A indicates generally a wax-disintegrating unit, and B a fruit-rubbing unit or "polisher" of known type often employed in packing houses handling citrus fruits, for example. In this arrangement, the comminuted wax product of the disintegrator falls by gravity directly into the polisher unit through an opening C provided in the top of the unit housing, and down upon the rotary polisher brushes D and the fruit E (e. g. oranges) as it enters the polisher and travels therethrough in the direction of the arrows F.

Figure 2:
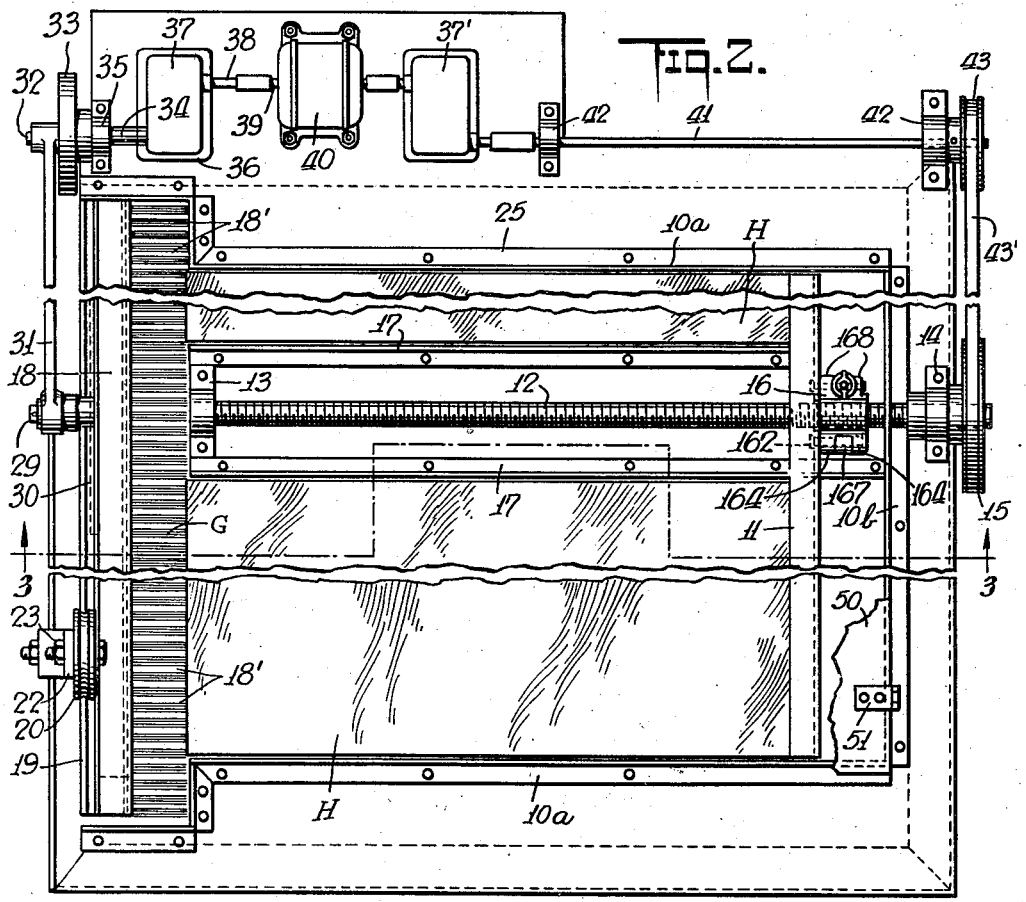
Fig. 2 is a plan view on a larger scale and partly broken away, of the disintegrating apparatus shown in Fig. 1, with the cover removed.

Referring now more particularly to Figs. 2, 3, 3—a and 4 for the construction of the distintegrator unit A, a suitable support for slab waxy material is provided which, in the illustrated embodiment, is in the form of a tray having a flat bottom 10, side walls 10ª and one end wall 10ᵇ remote from the abrading or disintegrating brush indicated generally at G. The opposite or front end, adjacent the brush, is open. The tray is arranged to receive a plurality of slabs H of waxy material, for example, at least one on each side of the longitudinal center line of the tray, their combined width approximating the length of the brush rolls D. Provision is made for slowly advancing the slabs of waxy material toward and through the open end of the tray into contact with the abrading brush. In the construction here illustrated, which has important practical advantages, an advancing member or pusher is provided by a follower 11 in the form of an angle-iron having one flange vertically disposed to bear against the rear end faces of the slabs, while the other flange overlies their upper rear margins and serves as a keeper. A feed screw 12 located in the longitudinal center line of the tray, and journaled in bearings 13 and 14 at the front and rear ends of the tray, respectively, and provided with means for rotating it, such as grooved pulley 15, extends through the rear wall of the tray and also passes loosely through a hole 110 in the follower 11. Threaded on screw 12 is a split nut 16 of usual type, which engages the rear face of the follower and is suitably held against rotary movement. This nut can be quickly engaged with or disengaged from the feed screw. When the nut engages the screw and the latter is rotated in the proper direction, the nut travels toward the open end of the tray (toward the left in Figs. 2 and 3), carrying with it the follower 11 and thereby advancing the slab wax against brush G. By disengaging the nut from the screw, the follower can be quickly returned manually to its starting position, as when placing new slabs of waxy material in the tray.

In the construction illustrated, the lower half 161 of the divided nut is secured to follower 11 by pins 162 and 163 carried on the rear face of the follower on opposite sides of the feed screw, these pins passing, respectively, through oppositely extending pairs of spaced apertured lugs 164, 165, with which the half-nut 161 is provided. The upper half-nut 166 has a lug 167 which fits between the lugs of pair 164 and through which pin 162 also passes, this construction providing a hinge connection between the two halves of the divided nut. On its opposite side, half-nut 166 carries a pair of spaced apertured lugs 168 in alignment with lugs 165 of the lower half-nut. Threaded eye bolt 169 is carried loosely on pin 163 between lugs 165, and is provided with thumb nut 170 whereby, with the parts in the position shown, the two halves of the divided nut 16 can be clamped into operative engagement with feed screw 12. By loosening the thumb nut and swinging the bolt outwardly, half-nut 166 can be swung upwardly to disengage it from the feed screw, thereby permitting the follower 11, by reason of its loose mounting on the feed screw, to drop down sufficiently far to free the lower half-nut also from engagement with the feed screw.

For the purpose of guiding the slabs of coating material as they are fed forward, a pair of parallel longitudinal rails 17, which may take the form of angle-irons as shown, are mounted on the tray bottom, one at each side of the feed screw. In the illustrated example, these guide rails extend upward to a level below the top of the waxy slabs, but higher than the lower edge of the follower.

The lower edge of the vertical flange of the follower 11 should therefore be so contoured, as by providing it with downwardly opening notches or slots 111 adapted and arranged to provide clearance between the follower and said guide rails, that the follower may be moved freely forward or back along the feed screw 12.

The brush G, mounted at the open front end of the tray for transverse rectilinear reciprocating movement across the ends of the slabs of coating material fed thereto, comprises a back 18 and a plurality of tufts of suitably stiff brush elements 18'. In the best embodiment of the invention, these are of resilient wire, for example, spring steel wire. The tufts 18' of such wire or other suitable material, are mounted in the back 18 in any usual and suitable way and are most desirably so arranged in tiers and rows, as shown in the drawings, as to provide suitable clearance spaces between the tufts, particularly vertically between the respective rows to allow for a free fall of comminuted waxy material from the slab as the said material is removed from the end of the slab by the brush.

The mounting of the brush whereby it may be oscillated across the ends of the slabs, as well as the means for causing such oscillation, may be of any suitable character. In the present example, angle bars 19 are screwed, respectively, by one flange to the opposite (upper and lower, as shown) lateral faces of the brush back, the free flanges of these bars running in the grooves of sets of grooved wheels 20, journaled on studs 21, projecting through holes in supports 22 and held by nuts 23. The supports 22 are secured to a suitable base member as, for example, one of the angle irons 24 extending across the apparatus and forming part of a base frame having longitudinal members 25 and 26, to which may be attached posts 27, and top frame members 28 carrying the slab support or tray 11.

The outermost sets of grooved wheels 20 are located at a distance apart less than the length of the angle bars 19 so as to allow for sufficient amplitude of the longitudinal oscillatory movement of the angle bars 19 and attached brush, while maintaining proper support thereof.

For oscillating the brush to and fro across the ends of the slabs of waxy material, a crank drive is employed in the specific apparatus here shown. To this end, the back of the brush is provided with a pintle pin 29, carried by a base 30, screwed or otherwise suitably secured to the brush back. On the pintle pin is mounted one end of a connecting rod 31 whose other end is mounted on a wrist pin 32 carried by a suitable crank, in this case in the form of a crank disk 33 fixed on the end of a shaft 34, journaled in an outboard bearing 35 and in the frame or casing 36 of a reduction gearing 37 having its high speed shaft 38 coupled to the drive shaft 39 of an electric motor 40, arranged to be energized from a suitable source of electricity and to be regulated and controlled by the usual control resistance or voltage regulators and switches (not shown).

The opposite end of the motor drive shaft extends rearward and drives, through a reduction gear 37', an extension shaft 41 mounted in suitable bearings carried by the machine framework. The extension shaft 41 serves to actuate the means for slowly advancing the slabs of waxy material toward and against the brush. In the present example, a grooved pulley 43 is fixed on the overhanging end of the extension shaft 41 and is connected by a belt 43' with the grooved pulley 15 on the end of the feed screw 12.

Below the abrading brush, a downwardly flaring outlet or discharge chamber is enclosed by front and rear walls 44, 45, and end walls 46, supported by frame members 47, 48, secured to the base frame of the apparatus. This chamber has its long dimension extending transversely of the disintegrator unit, and its lower edges are adapted to register with the edges of the correspondingly shaped aperture C provided in the top of the housing 49 of the polisher unit when the disintegrator unit is set in proper position thereon as shown in Fig. 1. The disintegrator unit is provided with a cover 50, hinged at 51 to permit lifting it and replenishing the supply of slab coating material. Housing in both units, as described, is advisable in order to minimize dispersal of dust-like particles of coating material into the outside atmosphere.

The operation of the disintegrator unit is obvious from the description hereinbefore set forth but may be briefly stated as follows:

The cover 50 is raised and the follower 11 moved back along the feed screw 12 to its rear-most position, the split nut being opened to release the nut from the feed screw so that the follower may be moved quickly, after which the split nut is closed to engage the threads of the feed screw. Slabs of waxy material of the proper composition and condition are now placed in the tray, usually one slab at each side of the feed screw, these slabs being of such size as to substantially fill the spaces allotted to them in the tray. If desired a plurality of narrower slabs may be used at each side of the feed screw. The cover having been lowered and the motor started, the described driving connections cause the abrading brush to oscillate and the feeding mechanism to advance the slab coating material against the brush.

The ends of the brush bristles travel across the face of the slabs of the relatively hard and brittle waxy or other suitable coating material, reducing a small amount of it at each stroke to a degree of fineness that can be regulated and controlled to a considerable extent by adjusting the rate of feed of the slab material to the brush, as well as the frequency of brush oscillation. The particles torn loose from the slab by each brush element can immediately escape outwardly from the slab face into the adjacent spaces between the vertical rows of such brush elements and fall downward in said spaces and then away from the brush.

The forward feed of the slabs to the brush in the present apparatus is continuous and should ordinarily be at such a rate that the brush elements will make a relatively very shallow cut into the solid mass of coating material at each stroke. In a typical instance, such forward feed may be on the order of one inch per hour. In this way a finer comminuted material may be obtained than with too heavy a feed, and at the same time the production of heat by friction between the wires of the brush and the waxy material may be reduced to a negligible minimum. The quantity production of the machine is determined to an important extent by the area of the slab ends and the area of the brush, rather than by the speed of oscillation of the brush; whereby it becomes possible to design the apparatus for production of the desired quantity per unit of time while still maintaining such a relatively low speed of oscillation of the brush as will avoid any substantial heating of the material in disintegrating it.

The disintegrating apparatus thus far described including the discharge or transfer chamber hereinbefore described, is a complete unit of compact and relatively simple construction, which can be quickly and inexpensively installed to operate in conjunction with a polisher unit already operating in a packing house.

In the specific type of rubbing unit or brush roll polisher conventionally illustrated in Fig. 1 by way of example, the rotary horsehair brush rolls D are arranged with their axes parallel, substantially horizontal, and transverse to the direction in which the stream of oranges or other articles travels through the unit; the brush rolls being arranged so closely together that their upper surfaces provide a supporting runway for said articles. The polisher brushes or rolls are trunnioned in a suitable frame, and are all rotated in the same angular direction with their upper surfaces moving in the direction of article travel (toward the right, in the drawing). A suitable source of power, such as motor 52, drives pulley 53 on shaft 54 which, in turn, actuates the brush rolls through a chain and sprocket drive, not shown. In this instance, proper travel of the articles through the polisher unit is maintained by the use of an overhead "clean-out" device comprising pushers 55 carried on a pair of endless chains 56 trained around sprockets 57, and continuously moved in the direction indicated by the arrows by driving connection 59 to the brush roll system. The described construction of this polisher unit is old and well known. It may be termed, broadly, a coating material applicator unit, specifically a wax applicator, when employed in combination with the novel disintegrator unit herein disclosed. The coating material may be, or include, a natural or synthetic gum or the like, so long as it is suitable for providing the articles with a coating that is protective or that improves the surface appearance of the articles.

As the oranges or other articles to be coated enter the applicator unit (at the left, in the drawings) they encounter a shower of the finely comminuted solid coating material discharged downwardly through the disintegrator outlet upon them and upon the applicator brush rolls. Globular articles, such as oranges or the like, are constantly turned over and over as they advance through the unit by the action of the rapidly rotating brush rolls. The comminuted coating material, much of which is so fine as to be dust-like, falls on both the traveling articles and on the brush rolls and tends to adhere to both; but in the case of such articles as fruits especially this tendency is preferential for the articles. Therefore, not only do the rotating brushes distribute over the surface of the articles such finely divided coating material as may already have fallen directly on the articles, but they also transfer thereto an additional amount; and by their thorough wiping and rubbing action, the brushes cause the fine particles of said material virtually to coalesce or weld together to form a substantially continuous thin film on the article surface.

Where, for reasons hereinbefore mentioned, it is desirable not to discharge the comminuted coating material directly into the applicator unit, but to interpose a greater delay period between formation thereof and actual application to articles, supplemental means may be provided for accomplishing this. Such means may be constructed to receive the comminuted material, transport it for a short time and deliver the well solidified fine material to the applicator unit.

A convenient type of device for this purpose is shown in Fig. 5. It comprises a rotary drum 60 located beneath the disintegrator brush with its longitudinal axis parallel to that of the brush. The length of the drum and its diameter are such that the drum will catch all the comminuted material as it falls from the brush. In the device illustrated in said Fig. 5, the upper portion of the drum extends somewhat into the discharge chamber heretofore described. In the best embodiment of this apparatus, the drum 60 is provided with a plurality of short metallic points or studs 61, serving to hold back the powder during a portion of the revolution of the drum, so that it will not immediately slide off the drum as the latter turns toward its discharge point. Furthermore, the said metallic studs will aid in radiating heat from the drum to the surrounding air. By the rotation of the drum the powder is dropped onto the polisher brushes and the articles being rubbed thereby.

In order to remove from the drum any powder which may have adhered to it, a rotary brush 62 is provided, which runs in contact with the outer surface of the drum and brushes downward any such powder particles as may cling to the drum. Any suitable means for driving the drum and its rotary brush may be employed.

Figs. 6 and 7 show another type of transfer and discharge mechanism. In this instance the disintegrator unit is presumed to be mounted to one side of the polisher unit instead of above it. Said mechanism comprises an endless conveyor belt 65 whose upper run extends beneath the disintegrator brush and thence, through a suitable opening in the side of the applicator housing and across the full width of the polisher unit, at a suitable height above the brush rolls. The fine material on that portion of the conveyor belt 65 which runs across and above the brush rolls is agitated and wiped off the conveyor belt by a rotary brush comprising a drum 66 having a single helix 67 of brush elements, this drum having a diameter greater than the width of the conveyor belt and having its axis parallel to the longitudinal axis of the belt. The width of the belt and the diameter of the drum are so related that the spiral brush will traverse the entire width of the belt for the requisite length thereof to wipe the comminuted material off the belt and drop it upon the polisher runway.

It will be noted that, in the constructions thus far described, the comminuted waxy material is finally delivered to the applicator unit wholly by gravity and, hence, at a velocity due to its free fall. While this is generally satisfactory, it is sometimes advantageous at the conclusion of the delay period, to direct the comminuted material downwardly upon the brush roll runway at a higher velocity than can be obtained by gravity only. Such desired higher velocity may be obtained by a modified form of transfer apparatus, which has means for discharging the comminuted waxy material with considerable initial velocity.

One form of apparatus which will receive the comminuted material from the disintegrator brush, retain it for the desired time period and then project it downwardly with considerable velocity is illustrated in Fig. 8. This apparatus comprises an endless belt conveyor 70 whose upper run extends across the open bottom of the discharge chamber, the conveyor belt passing around rotatable drums 71 and 72, one of which is driven by suitable driving mechanism (not shown). The said upper run is of such dimensions as to catch all the comminuted waxy material falling from the disintegrator brush and carry it to a desired point of discharge over the applicator brush rolls. At the point of discharge, a rotary discharge brush 73, having its axis transverse to the line of travel of the upper run of the belt is arranged to make good contact with the surface of the conveyor belt where it passes around the drum 72.

The said rotary brush is rotated by a suitable driving means (not shown) at a peripheral speed considerably greater than the speed of travel of the conveyor belt, whereby the comminuted material carried by the belt to the place of contact with the rotary discharge brush, is projected downwardly from the apparatus with considerable velocity. By regulating the speed of rotation of the rotary discharge brush 73, the velocity with which the powder particles impinge on the brush roll runway and articles thereon may be controlled.

What is claimed is:

1. Apparatus for reducing solid waxy or other coating material to comminuted form suitable for coating articles, which comprises, in combination, a member adapted and arranged to provide a substantially horizontal support for such coating material in slab form, a disintegrating member having abrading elements extending laterally to present a substantially upright abrading face, said abrading elements being so spaced apart as to provide clearance permitting comminuted coating material to fall from between them, and said disintegrating member being mounted for oscillatory movement of said face operatively adjacent such supporting member and transversely thereof, driving means for giving said disintegrating member such oscillatory movement, feed mechanism operative to continuously advance material in slab form horizontally along said supporting member at an angle to and against said abrading face, and screw means for driving said feed mechanism.

2. The apparatus set forth in claim 1, wherein said supporting member supports the slab coating material horizontally, while said abrading face is substantially flat and extends vertically, and said oscillatory movement of the abrading face is substantially horizontal and rectilinear.

3. Apparatus as set forth in claim 1, in combination with a supporting base and framework connecting all the said parts of the apparatus into a structural unit.

4. Apparatus for reducing solid wax or other coating material to comminuted form suitable for coating articles, which comprises, in combination, a supporting device open at one end and arranged to support a slab of such material while permitting sliding movement of such slab thereon, a disintegrator brush having relatively stiff bristles so spaced apart as to provide clearance permitting comminuted coating material to fall from between them, means mounting said brush for oscillatory movement across the open end of the supporting device with said bristles extending laterally to present a substantially upright abrading face adjacent said open end, driving means for giving said brush such movement, a follower arranged to bear against such slab of coating material, and feed mechanism arranged to progressively advance the follower and thereby feed the slab of material beyond the open end of the supporting device against the oscillating brush, and driving means for said feed mechanism.

5. Apparatus for comminuting waxy or other material suitable for coating articles, which comprises, in combination, a flat bottomed supporting device open at one end and horizontally disposed, adapted to support slabs of such material, a disintegrator brush having a plurality of brush elements arranged with clearance spaces between them, means mounting said brush for horizontal rectilinear oscillatory movement across the open end of the supporting device, driving means for giving said brush such movement, the area of the brush face being at least equal to the area of the open end of the supporting device, a follower in the supporting device extending substantially parallel to the path of the brush movement and arranged to bear against slabs of material in the supporting device, a feed screw extending centrally of the supporting device and substantially perpendicular to the path of brush movement, a split nut device carried by the follower and arranged to be engaged with and disengaged from said feed screw, slab-guiding means extending along the bottom of the supporting device at each side of the feed screw, and means for driving the feed screw to progressively advance the follower toward the brush whereby the slab material in the supporting device will be pressed against the brush elements, comminuted by the oscillating brush, and discharged from the clearance spaces of said brush.

6. Apparatus as set forth in claim 5 in combination with a supporting base and framework connecting all the said parts of the apparatus into a structural unit.

7. In apparatus for coating articles with waxy or other coating material, the combination with a coating material applicator unit, of a disintegrator unit arranged to deliver comminuted solid coating material thereto, said disintegrator unit comprising an oscillatory disintegrator brush, means for oscillating said brush, means for advancing a slab of solid coating material into contact with the face of the brush, whereby finely comminuted solid coating material is produced, and means whereby said comminuted material is delivered to said applicator unit.

8. In apparatus for coating articles, the combination, with a coating material applicator unit, of a disintegrator unit arranged to deliver comminuted solid coating material thereto, said disintegrator unit comprising a disintegrator brush having its face composed of a plurality of brush elements arranged in rows to provide clearance spaces, means for advancing coating material in slab form to the face of the brush, means for oscillating the brush transversely to the direction of advance of the slab whereby the coating material is comminuted, and means allowing the discharge of the comminuted material from the clearance spaces of the brush to the applicator unit.

9. In apparatus for coating articles, the combination, with a housed coating material applicator unit, of a disintegrator unit comprising an oscillatory brush having a plurality of brush elements arranged to provide vertical clearance spaces, means for advancing slab coating material to the brush elements, whereby the coating material is comminuted and discharged through the clearance spaces, and an enclosed outlet beneath the brush registering with an inlet in the housing of the applicator unit through which comminuted material from the clearance spaces of the brush may be delivered to said applicator unit.

10. In apparatus for coating articles, the combination, with a coating material applicator unit, of a disintegrator unit comprising an oscillatory brush having a plurality of brush elements arranged to provide vertical clearance spaces, means for oscillating the brush, means for advancing slab coating material to the brush elements, whereby the coating material is comminuted and discharged through the clearance spaces, and a traveling conveyor arranged to receive the comminuted material from the clearance spaces of the brush and deliver it to said applicator unit.

11. In apparatus for coating articles, the combination, with a coating material applicator having rotary brush rolls, of a disintegrator unit comprising an oscillatory brush having a plurality of brush elements arranged to provide vertical clearance spaces, means for oscillating the brush, means for advancing slab coating material to the brush elements, whereby the coating material is comminuted and discharged through the clearance spaces, and means for projecting the comminuted material forcibly upon brush rolls of the applicator unit.

12. In apparatus for coating articles, the combination, with a coating material applicator having rotary brush rolls, comprising an oscillatory brush having a plurality of brush elements arranged to provide vertical clearance spaces, means for oscillating the brush, means for advancing a slab coating material to the brush elements, whereby the coating material is comminuted and discharged through the clearance spaces, a traveling conveyor arranged to receive the comminuted coating material from the clearance spaces of the brush and conduct it to said applicator unit, and means for discharging the comminuted material from said conveyor at a relatively high velocity upon brushes of said applicator unit.

13. In an apparatus for reducing solid waxy or other coating material to comminuted form suitable for coating articles, the combination, with an oscillatory disintegrating member having a substantially upright plane abrading face and comprising a plurality of abrading elements arranged in tiers and rows with a clearance space between each pair of adjacent rows to permit the rapid escape of comminuted material from the respective abrading elements, of a supporting device arranged to support a slab of the solid coating material with one end of said slab in operative relation to the abrading face of the disintegrating member, means for feeding the slab of coating material along the supporting member towards and into contact with the abrading face to allow the latter to disintegrate the end of the slab and discharge the comminuted material through its clearance spaces, and means for oscillating the disintegrating member across the end of the slab of coating material, the supporting device and oscillatory disintegrating member being mounted to provide a free space below the clearance spaces of the abrading face to permit a free escape of the comminuted particles from said clearance spaces.

THOMAS GEORGE CUNNING.